United States Patent
Dinwiddie et al.

(10) Patent No.: US 7,124,210 B1
(45) Date of Patent: Oct. 17, 2006

(54) METHOD AND APPARATUS FOR UPDATING COMPUTER CODE USING AN INTEGRATED CIRCUIT INTERFACE

(75) Inventors: Aaron Hal Dinwiddie, Cicero, IN (US); Kevin Eugene Nortrup, Fairland, IN (US); Derek Liu, Carmel, IN (US); Yefim Vayl, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/830,235

(22) PCT Filed: Nov. 3, 1999

(86) PCT No.: PCT/US99/25253

§ 371 (c)(1),
(2), (4) Date: Apr. 24, 2001

(87) PCT Pub. No.: WO00/26767

PCT Pub. Date: May 11, 2000

Related U.S. Application Data

(60) Provisional application No. 60/106,809, filed on Nov. 3, 1998.

(51) Int. Cl.
  *G06F 13/10* (2006.01)
  *G06F 13/38* (2006.01)
(52) U.S. Cl. .............. 710/16; 710/11; 710/14; 710/15; 710/104; 710/105
(58) Field of Classification Search .............. 710/8, 710/10, 14, 15, 19, 29, 33, 104; 711/170; 713/1, 2, 100; 714/5; 717/139, 141; 725/152; 348/734
See application file for complete search history.

(56) References Cited

U.S. PATENT DOCUMENTS

| | | | |
|---|---|---|---|
| 5,522,049 A * | 5/1996 | Kimura et al. ............ | 710/301 |
| 5,537,292 A | 7/1996 | Bowen ..................... | 361/737 |
| 5,815,426 A * | 9/1998 | Jigour et al. .............. | 365/51 |
| 5,818,029 A * | 10/1998 | Thomson .................. | 235/486 |
| 5,877,975 A * | 3/1999 | Jigour et al. .............. | 365/52 |
| 5,979,773 A * | 11/1999 | Findley et al. ............ | 235/492 |
| 5,980,934 A * | 11/1999 | Reber et al. .............. | 424/449 |
| 5,984,731 A * | 11/1999 | Laity ....................... | 439/676 |
| 6,016,348 A * | 1/2000 | Blatter et al. ............. | 380/228 |
| 6,044,215 A * | 3/2000 | Charles et al. ............ | 703/25 |
| 6,125,405 A * | 9/2000 | Farges ..................... | 710/2 |
| 6,138,173 A * | 10/2000 | Hisano ..................... | 710/2 |
| 6,223,348 B1* | 4/2001 | Hayes et al. .............. | 725/152 |
| 6,266,415 B1* | 7/2001 | Campinos et al. ........ | 380/247 |
| 6,308,317 B1* | 10/2001 | Wilkinson et al. ........ | 717/139 |
| 6,457,647 B1* | 10/2002 | Kurihashi et al. ........ | 235/486 |
| 6,893,268 B1* | 5/2005 | Harari et al. ............. | 439/43 |

FOREIGN PATENT DOCUMENTS

| | | |
|---|---|---|
| DE | 29613548 | 10/1996 |
| JP | 10069529 A * | 3/1998 |

* cited by examiner

*Primary Examiner*—Ilwoo Park
(74) *Attorney, Agent, or Firm*—Joseph J. Laks; Robert D. Shedd; Paul P. Kiel

(57) ABSTRACT

A method and apparatus for providing computer code updates through an integrated circuit card (smart card) interface. The smart card interface within a computer control device determines whether the card that is inserted into the smart card interface is either a memory card or a conventional smart card. Once the smart card interface has detected that the memory card has been inserted, the interface requests data from the card. The interface provides the computer code to the memory of the computer controlled device to update the computer code therein.

13 Claims, 2 Drawing Sheets

METHOD AND APPARATUS FOR UPDATING COMPUTER CODE USING AN INTEGRATED CIRCUIT INTERFACE

This application claims the benefit of U.S. provisional application Ser. No. 60/106,809 filed Nov. 3, 1998, which is hereby incorporated herein by reference, and which claims the benefit under 35 U.S.C. § 365 of International Application PCT/US99/25253, filed Nov. 3, 1999, which was published in accordance with PCT Article 21(2) on May 11, 2000 in English.

BACKGROUND OF THE DISCLOSURE

1. Field of the Invention

The present invention relates to techniques for updating computer code in computer controlled devices and, more particularly, the invention relates to a method and apparatus for updating computer code in computer controlled devices utilizing an integrated circuit card (smart card) interface.

2. Description of the Background Art

Many consumer electronics devices such as pay TV systems, set top cable television boxes, terrestrial television receivers, satellite television receivers and the like, require periodic software updates to provide signal processing, interactive features, and security improvements to the consumer. Software upgrades for such devices are generally performed by replacing the read only memory chips within the device or connecting a computer to a data port on the device to download the software upgrade into the memory of the device. Such upgrades require a technician to visit the consumer's location and perform the upgrade of the software. Alternatively, the consumer must return the device to the manufacturer, then be provided a replacement device that contains the upgraded software. Such a software upgrade process is time consuming and costly.

Therefore, a need exists in the art for an improved technique for upgrading computer code within a computer controlled device.

SUMMARY OF THE INVENTION

The disadvantages associated with the prior art are overcome by the invention of a method and apparatus for providing computer code through a smart card interface. The invention utilizes a memory card, i.e., a smart card containing a solid state memory device, that stores software that is used to update (or otherwise supplement) the software within a computer controlled device.

In accordance with one aspect of the present invention, the smart card interface within the computer controlled device determines whether the card that is inserted into the smart card interface is either a memory card or a conventional smart card. A memory card has a connector arrangement that complies with ISO standard 7816-2 and high speed data ports of an NRSS-type card such that the software update can be performed through the smart card interface. Once the smart card interface has detected that a memory card has been inserted, the interface requests data from the card. Specifically, the interface provides an NRSS-type clock signal to the memory card causing the NRSS data port to supply the computer code update from the memory card at the rate of about 42 Mbits/second. The smart card interface reads the data stream header within the data being supplied by the memory card such that the interface makes a decision to accept the computer code data or reject that data. The header information also supplies the interface with operation termination conditions e.g., end of file information. The interface provides the computer code to the memory of the computer controlled device to update the computer code therein.

The technique of the present invention can be widely used in any type of firmware updateable embedded system. It is very convenient for a service person to update the product software in the field as well as for the customer to update the product software themselves.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The method and apparatus of the present invention are applicable in performing computer code updates within any computer controlled device having an integrated circuit card interface (commonly known as a smart card interface). Such computer controlled devices are in broad use in consumer electronics components such as direct broadcast satellite television systems, set top boxes for cable and video-on-demand systems, high definition television systems, and the like.

Figure 1:
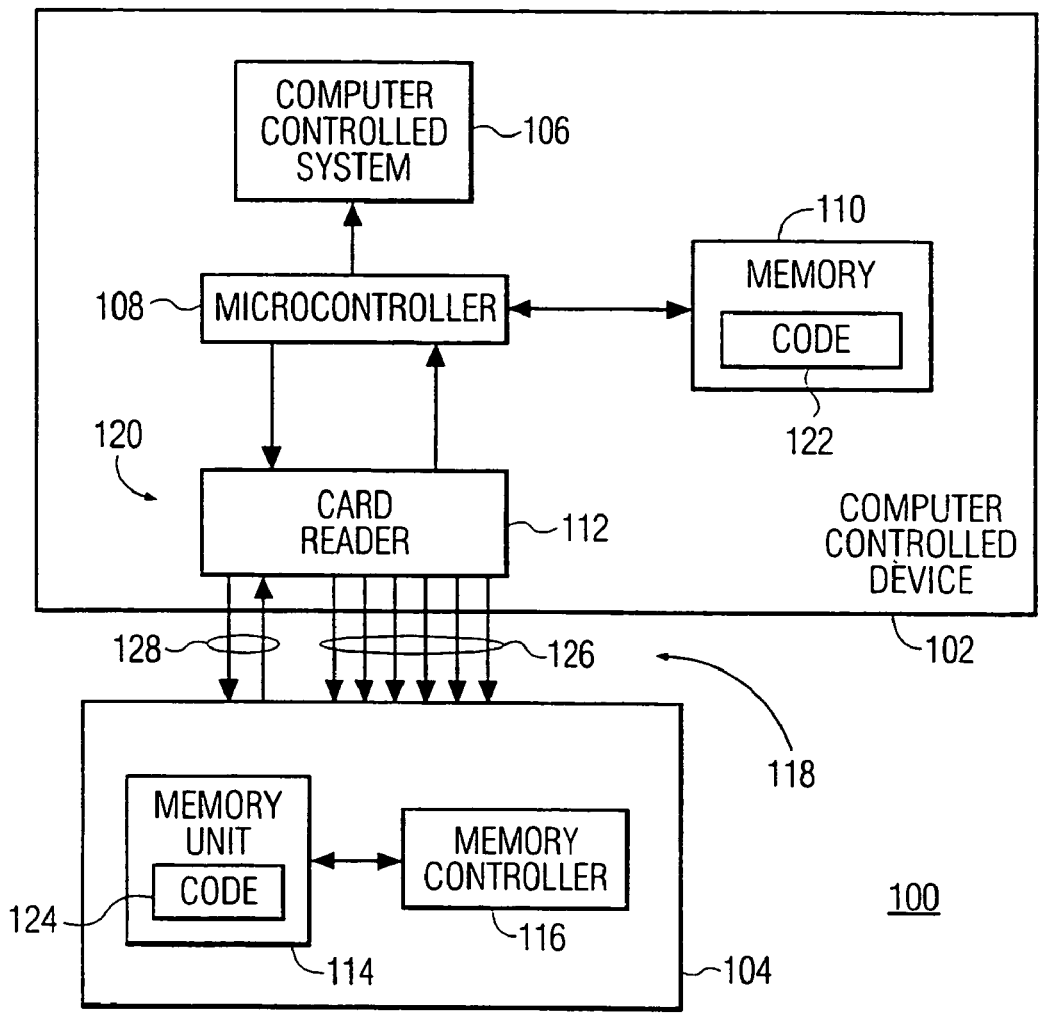
FIG. 1 depicts a block diagram of a software updating system including a smart card interface that operates in accordance with the present invention.

FIG. 1 depicts a software updating system 100 comprising a computer controlled device 102 having a smart card interface 120 and a memory card 104. The computer controlled device 102 comprises a microcontroller 108, a computer controlled system 106 (for example, the video processing functions of a television), and a memory 110 wherein the computer code 122 to be updated is stored. The computer controlled device 102 further contains a card reader 112 for a smart card and a connector 118 that forms the smart card interface 120 to a smart card 104. The smart card interface 120 can read either conventional smart cards which comply with the ISO standard 7816 smart card format or an NRSS type smart card, i.e., a 7816 compliant card having two high speed data ports. In the current embodiment of the invention, the NRSS smart card contains a memory unit 114 and a memory controller 116 which together form the memory card 104.

The connector 118 comprises eight conductive paths for activating and accessing the card 104. These paths include six paths 126 that comply with ISO standard 7816-2, namely: supply voltage, reset signal, clock signal, ground, programming voltage, data input/output. In addition, the card 104 includes two paths 128 for a high-speed data input and a high-speed data output. Other embodiments of the invention may supply the software through the conventional 7816 I/O port, or through a completely different pin and port arrangement. A detailed description of a smart card interface for accessing a smart card having a conventional ISO standard 7816-2 connector with high speed data input and output capabilities is described in U.S. Pat. No. 5,852,290, issued Dec. 22, 1998 (filed Aug. 4, 1995), entitled "Smart- Card Based Access Control System With Improved Security", and incorporated herein by reference in its entirety.

After the memory card 104 is inserted into the smart card interface 120, the interface 120 determines whether the smart card is a conventional smart card or a memory card 104 containing the computer code update 124. After recognizing a memory card 104 has been inserted, the microcontroller 108 activates an NRSS interface (as opposed to a conventional ISO standard 7816 interface) to utilize the high speed data ports and extracts the data (the executable computer code 124) from the memory card at about 42 Mbits/second. The computer code 124 is channeled to the memory 110 and used to update the contents of the memory 110. In this manner, 3.5 Mbits code size can be updated in the computer controlled device 102 in less than two minutes. The term "update" is meant to include downloading "patch" software that supplements existing software stored in the memory 110 as well as downloading entirely new software to the memory 110.

Figure 2:
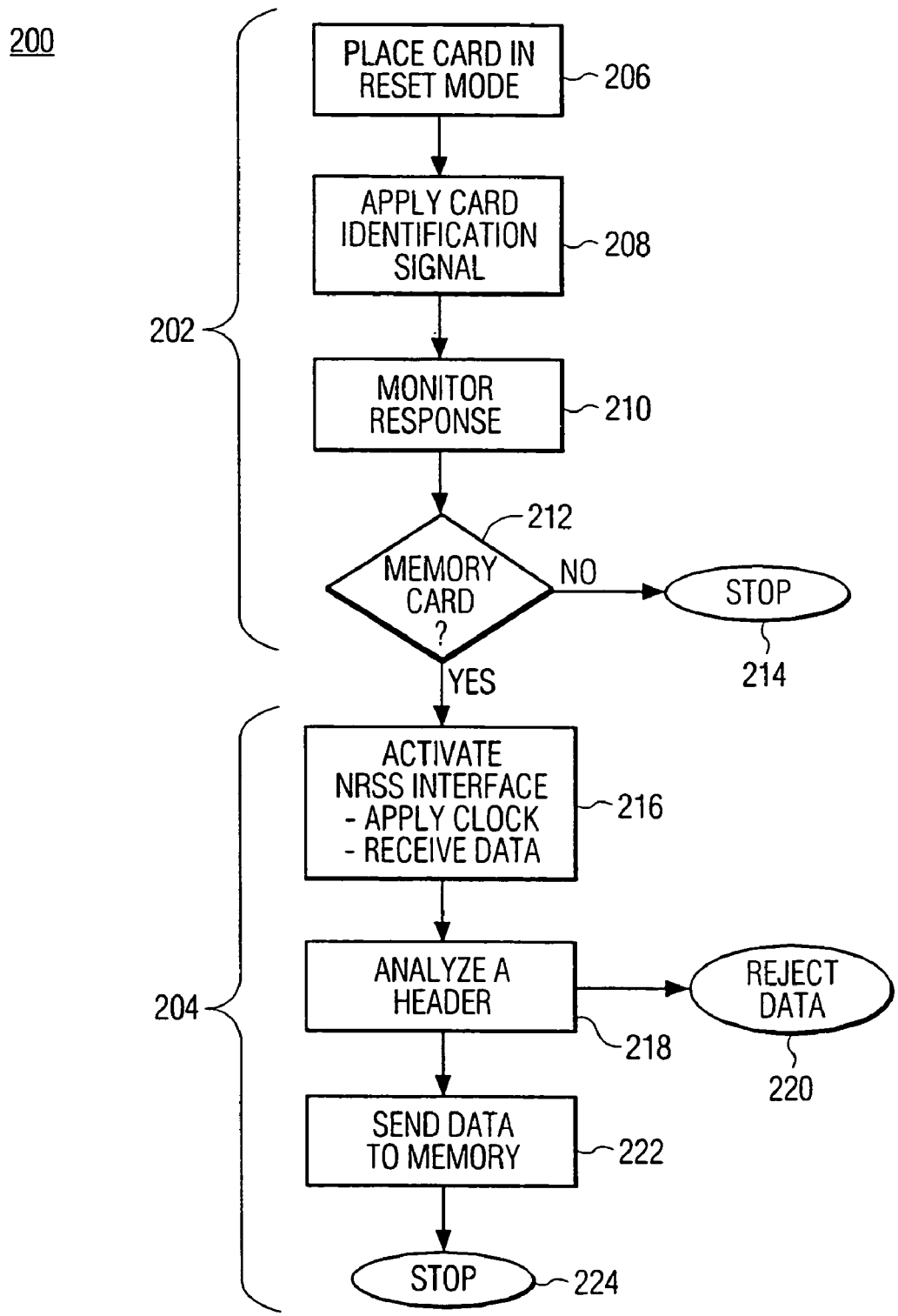
FIG. 2 depicts a flow diagram showing the operation of the present invention.

FIG. 2 depicts a flow diagram of the process 200 used to update the computer code of a computer controlled device. The computer code update process 200 is performed in two stages. The first stage 202 identifies a memory card as opposed to other types of smart cards and the second stage 204 loads the data from the memory card into the memory of the microcontroller.

In the memory card identification stage 202, the microcontroller, at step 206, places the inserted card in ISO/7816 reset state, i.e., the interface toggles the reset signal path. In the reset state, a conventional smart card is in sleep mode, and will not respond to an external signal. As such, any signal applied to any of the pins of the smart card would be ignored by a conventional 7816 smart card. In contrast, a memory card, although in sleep mode, monitors the clock input path, e.g. a SC_CLK input terminal. At step 208, the microcontroller applies a pulse signal to the smart card's SC_CLK terminal. The pulse signal, for example, transitions to high from low and back to high again. In response, the data input/output path of a memory card produces an opposite state signal. At step 210, the microcontroller monitors the data input/output path of the interface connection for a responsive signal. As such, the microcontroller will consider, at step 212, the inserted card as a memory card if the data input/output signal transitions from low to high and then to low, i.e., the data input output signal is opposite the applied clock signal. Otherwise, the routine 200 proceeds to step 214 and stops. After card identification stage is complete 202, the system starts to request data from the card in stage 204.

In the data requesting stage 204, the controller, at step 216, utilizes the NRSS interface, i.e., using NRSS_CLK and NRSS_DATA control input, to extract data, i.e., the new updated executable code, from the memory card at a about 42 MB/second rate. The data stream header is analyzed at step 218. According to the data stream header, the microcontroller will make a decision to accept the code data or reject it, as well as obtain operation termination conditions, i.e., obtain an end-of-file identifier. If the data is rejected, the routine 200 proceeds to step 220. If the data is accepted, at step 222, the data is sent to the memory within the computer controlled device for storage. The routine stops, at step 224, when a termination condition is met, i.e., an error occurs or a data file end-of-file code is reached.

The inventive technique can be widely used on any type of firmware updateable imbedded systems such as set top boxes, consumer electronics equipment and the like. It is very convenient for the service person to update the product software in the field, as well as for the customer to update the product software themselves.

Although one embodiment which incorporates the teachings of the present invention has been shown and described in detail herein, those skilled in the art can readily devise many other varied embodiments that still incorporate these teachings.

The invention claimed is:

1. An apparatus for loading computer code from a memory type integrated circuit card preloaded with computer code, said apparatus comprising:
   a card interface capable of distinguishing between a conventional integrated circuit card and said memory card, said card interface including a connector having a first data port for transferring data in accordance with a first standard and a second data port for transferring data in accordance with a second standard;
   a memory for storing computer code for execution by the apparatus; and
   a microcontroller coupled to the card interface and to the memory for, if said card is a memory card, reading said computer code from said memory card by way of said second data port to said memory, for thereby updating the computer code stored in said memory so as to effect a change of the functional operation of the apparatus.

2. The apparatus of claim 1, wherein said card interface comprises:
   means for producing a first signal that is coupled to an integrated circuit card connection; and
   means for analyzing a second signal that is produced by a said memory card in response to said first signal.

3. The apparatus of claim 2, wherein said second signal is not produced by integrated circuit cards that are not memory cards.

4. The apparatus of claim 2, wherein said card interface applies said first signal to a clock signal connector of said integrated circuit card connection and receives said second signal on a data input/output signal connector of said integrated circuit card connection.

5. The apparatus of claim 1 wherein said card interface further comprises:
   means for transferring computer code from said memory card to said memory.

6. The apparatus of claim 1, wherein said card interface microcontroller further comprises:
   means for accepting or rejecting the computer code for transference from said memory card to said memory.

7. A method of loading computer code in a computer controlled device, comprising the steps of:
   receiving a smart card in a smart card interface comprising a connector having a first data port for transferring data in accordance with a first standard and a second data port for transferring data in accordance with a second standard;
   identifying whether the smart card is a memory card containing a memory unit with preloaded computer code, and a memory controller, or a conventional integrated circuit card; and
   if said card is a memory card, transferring the computer code in said memory card through said second data port of a memory card into said computer controlled device; such that the transferred computer code is stored in a memory so as to effect a change in the functionality of the computer controlled device.

8. The method of claim 7 wherein said identifying step further comprises the steps of:
   applying a first signal to said memory card;

analyzing a second signal produced by said memory card in response to said first signal to determine if said smart card is a memory card.

9. The method of claim 8 wherein said transferring step further comprises:

activating an NRSS interface.

10. The method of claim 7 further comprises:

analyzing a header of said computer code to determine the validity of the computer code.

11. The method of claim 7 further comprising toggling a reset signal.

12. The method of claim 11, further comprising said memory card monitoring a clock imputer terminal for a first signal in response to said toggled reset signal.

13. The method of claim 12, wherein said memory card generates a second signal in response to detection of said first signal.

* * * * *